A. J. Olney,
Bag Filler
No. 92,347. Patented July 6. 1869.

Witnesses
Hinchman
Jno. F. Brooks

Inventor
A. J. Olney
per Munn & Co.
Attorneys

ASA J. OLNEY, OF VAN BUREN, INDIANA.

Letters Patent No. 92,347, dated July 6, 1869.

IMPROVEMENT IN BAG-FILLERS.

The Schedule referred to in these Letters Patent and making part of the same.

*To all whom it may concern:*

Be it known that I, ASA J. OLNEY, of Van Buren, in the county of La Grange, and State of Indiana, have invented a new and improved Bag-Filler, and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

Figure 1:
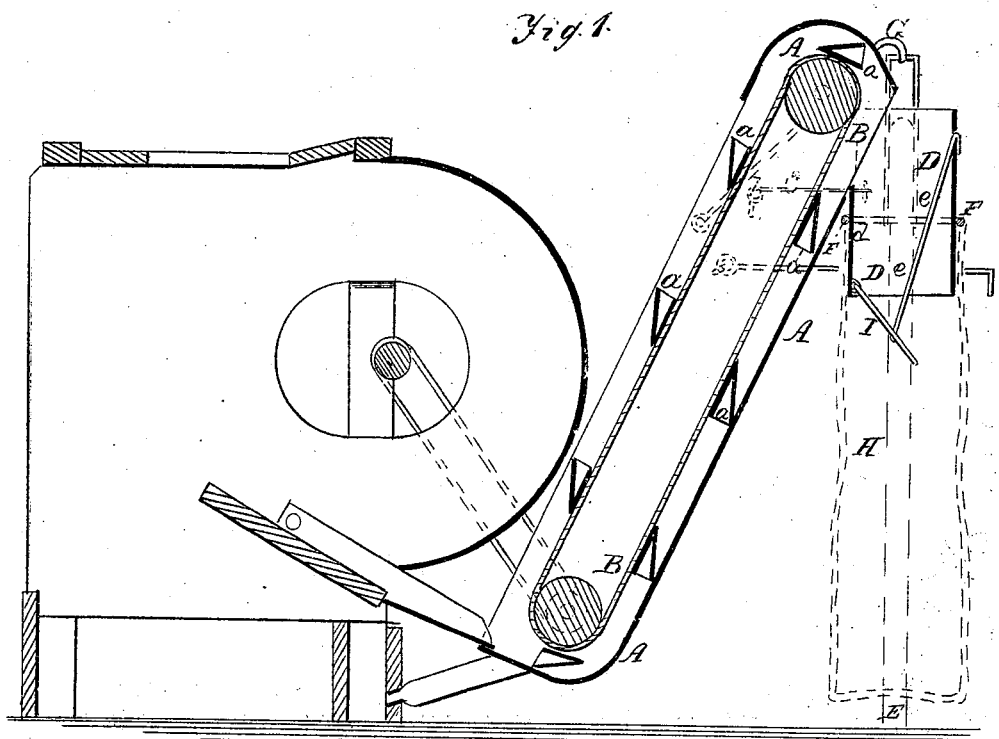
Figure 1 represents a vertical longitudinal section of my improved bag-filler.
Figure 2:
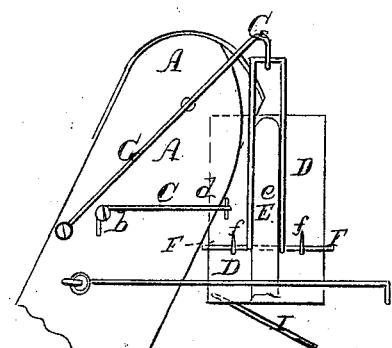
Figure 2 is a side view of the same.

This invention relates to a new bag-filling attachment to the elevating-apparatus of winnowing-machines, and has for its object to provide a bag-filler, which is readily detachable, and which will operate without injuring the bag.

The invention consists in the arrangement of a removable funnel, which is attached to the discharge-end of the elevator, and which carries a spring-frame, to which the bag is attached, the spring causing the bag to settle gradually as it becomes filled, and prevents it from tearing.

A, in the drawing, represents the elevator of a winnowing-machine, provided with a revolving apron, B, which carries elevating-cups $a\,a$.

To the elevator-frame is, by means of hooks C C, that catch over pins $b$, secured a four-sided box, D, which is open on top and bottom.

This box is further supported by posts E E, as shown, and has the upper part of its inner side $d$ cut away, so that the ends of its side $e\,e$ may fit into grooves or recesses provided in the frame of the elevator.

Around this box D is fitted loosely a wire frame, F, which is, by means of spring-rods G G, suspended from the elevator-frame, and which has pointed hooks $f\,f$ formed on it, as shown.

Figure 3:
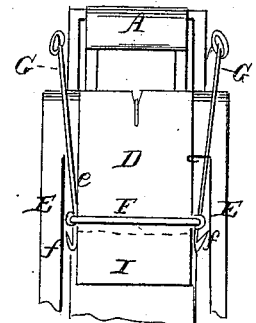
Figure 3 is a front view of the same.

The bag H is, with its upper end, fitted around the lower part of the box D, and is suspended from the hooks $f$ of the frame F, as shown in fig. 3.

The grain discharged by the elevator will all fall into the bag, which, being supported by the springs, will yield to the increased weight, and strain the springs as it becomes filled. In this manner considerable strain is removed from the bag, and the same is prevented from becoming injured.

A hinged plate, I, may be arranged in the box, to receive the dropping grain, and to prevent it from falling at once to the bottom of the bag.

Having thus described my invention,

What I claim as new, and desire to secure by Letters Patent, is—

The bag-filler, consisting of the removable box D and of the supporting-frame F, which is suspended from springs, and which carries the fastening-pins or hooks $f$, all arranged and operating substantially as herein shown and described.

ASA J. OLNEY.

Witnesses:
WM. HACHENBERG,
WM. L. FOLLMER.